(12) United States Patent
Poradzisz

(10) Patent No.: US 9,752,327 B2
(45) Date of Patent: Sep. 5, 2017

(54) SUPPORT FOR RIGID PANEL

(71) Applicant: Andrzej Poradzisz, London (GB)

(72) Inventor: Andrzej Poradzisz, London (GB)

( * ) Notice: Subject to any disclaimer, the term of this patent is extended or adjusted under 35 U.S.C. 154(b) by 0 days.

(21) Appl. No.: 14/909,155

(22) PCT Filed: Jul. 30, 2014

(86) PCT No.: PCT/GB2014/052341
§ 371 (c)(1),
(2) Date: Feb. 1, 2016

(87) PCT Pub. No.: WO2015/015206
PCT Pub. Date: Feb. 5, 2015

(65) Prior Publication Data
US 2016/0186790 A1    Jun. 30, 2016

(30) Foreign Application Priority Data

Jul. 31, 2013  (GB) .................................. 1313694.0

(51) Int. Cl.
*E04F 11/18* (2006.01)
*E06B 3/54* (2006.01)
(Continued)

(52) U.S. Cl.
CPC .......... *E04F 11/1853* (2013.01); *E04F 11/18* (2013.01); *E04F 11/1812* (2013.01); *E04F 11/1817* (2013.01); *E04F 11/1834* (2013.01); *E04F 11/1851* (2013.01); *E06B 3/5454* (2013.01); *F16B 2/065* (2013.01); *F16B 5/0685* (2013.01); *F16M 13/02* (2013.01); *E04F 2011/1823* (2013.01); *E04F 2011/1825* (2013.01); *E04F 2011/1827* (2013.01); *E04F 2011/1829* (2013.01)

(58) Field of Classification Search
CPC .............. E04F 11/1851; E04F 11/1834; E04F 11/1817; E04F 11/1853; E04F 11/1812; E04F 2011/1823; E04F 2011/1825; E04F 2011/1827; E04F 2011/1829; E04F 11/18; E06B 3/5454; F16B 5/0685
See application file for complete search history.

(56) References Cited

U.S. PATENT DOCUMENTS 4,054,268 A * 10/1977 Sher .................... E04F 11/1851
256/24
4,870,793 A * 10/1989 Tomlinson .......... E04F 11/1851
52/126.1
(Continued)

FOREIGN PATENT DOCUMENTS

DE    4417272 C1 * 11/1995 ............. A47B 96/07
DE    29515491 U1 *  1/1996 .......... E04F 11/1851
(Continued)

*Primary Examiner* — Eret McNichols
(74) *Attorney, Agent, or Firm* — Shumaker, Loop & Kendrick, LLP; Michael E. Dockins

(57) ABSTRACT

A support for a rigid panel (16) comprising an elongate channel (12) for attaching to a surface, at least one cradle (14) for receiving an edge of the panel, each cradle being receivable in the elongate channel and angularly adjustable about a longitudinal axis relative thereto, and locking means (18, 20) for securing the or each cradle to the elongate channel in an adjusted position.

20 Claims, 4 Drawing Sheets

(51) Int. Cl.
  *F16B 2/06* (2006.01)
  *F16B 5/06* (2006.01)
  *F16M 13/02* (2006.01)

(56) References Cited

U.S. PATENT DOCUMENTS

| | | | | |
|---|---|---|---|---|
| 6,419,209 | B1 * | 7/2002 | Shepherd | E04F 11/1851 256/24 |
| 7,036,799 | B2 * | 5/2006 | Shepherd | E04F 11/1851 256/24 |
| 7,866,636 | B1 * | 1/2011 | Hansen | E04F 11/1836 256/65.14 |
| 7,963,077 | B2 * | 6/2011 | Lin | E06B 3/72 52/204.591 |
| 8,181,405 | B2 * | 5/2012 | Nash | E04F 11/1851 52/127.8 |
| 8,388,214 | B1 * | 3/2013 | Toro | F21V 33/006 362/147 |
| 9,303,444 | B1 * | 4/2016 | Choi | E06B 3/549 |
| 9,366,382 | B2 * | 6/2016 | Bonomi | E04F 11/1853 |
| 2001/0025953 | A1 | 10/2001 | Shepherd | |
| 2006/0070318 | A1 * | 4/2006 | Chen | E06B 3/5454 52/204.65 |
| 2015/0240851 | A1 * | 8/2015 | Giacometti | F16B 9/023 403/374.3 |
| 2015/0267415 | A1 * | 9/2015 | Zhou | E04F 11/1853 52/208 |

FOREIGN PATENT DOCUMENTS

| | | | | |
|---|---|---|---|---|
| DE | WO 2009003431 | A1 * | 1/2009 | E04F 11/181 |
| FR | 2300867 | A1 * | 9/1976 | E04F 11/1812 |
| FR | 2930270 | B1 * | 6/2012 | E04F 11/1851 |
| GB | 2512933 | A * | 10/2014 | E04F 11/1812 |
| WO | 9936637 | A1 | 7/1999 | |
| WO | 0142587 | A1 | 6/2001 | |
| WO | 2011095779 | A2 | 8/2011 | |
| WO | WO 2011156463 | A2 * | 12/2011 | E04F 11/1851 |

* cited by examiner

SUPPORT FOR RIGID PANEL

CROSS-REFERENCE TO RELATED APPLICATIONS

This patent application is a United States National Stage of International Application No. PCT/GB2014/052341, filed Jul. 30, 2014, which in turn claims the benefit of United Kingdom Patent Application No. GB1313694.0, filed Jul. 31, 2013. The entire disclosures of the above patent applications are hereby incorporated herein by reference.

FIELD OF THE INVENTION

The present invention relates to a support for a rigid panel.

BACKGROUND TO THE INVENTION

It is well known to use a channel as a support for a panel in a balustrade system. Typically, the panel is held in place within the channel by utilising one of a variety of methods: clamping with bolts, sealing with resin or wedging in place.

A major disadvantage of this system is the requirement for access from both sides of the balustrade in order to fix the panel into place. This creates a challenge when attempting to vertically align the panel, and often will require multiple labourers to work on the installation simultaneously. Additionally, installation of a balustrade on higher levels of a building, for instance on a balcony, necessitates the use of scaffolding platforms, or access towers, increasing both the cost and time taken to complete the project.

It is an object of the invention to reduce or substantially obviate the above mentioned problems.

STATEMENT OF INVENTION

According to the present invention there is provided a support for a rigid panel comprising an elongate channel for attaching to a surface, at least one cradle for receiving an edge of the panel, the at least one cradle being receivable in the elongate channel and angularly adjustable about a longitudinal axis relative thereto, and locking means for securing the or each cradle to the elongate channel in an adjusted position.

The locking means for the or each cradle may be operable from only one side of the elongate channel.

The support is advantageous as it greatly reduces the effort required to install and vertically align a (generally glass) panel in a balustrade set-up. The panel can easily rest in the cradle(s) whilst the installer secures it in place, and the ability to secure the cradles in place from only one side reduces the time and manpower required to install. However, the main advantage of installation from a single side is that a balustrade can be erected at a high level, on a balcony for instance, without the need for access towers or scaffolding platforms, which can drastically increase the cost and complexity of what ought to be a simple project. Similarly, access from a single side vastly decreases the difficulty of mounting the balustrade to a fascia, as access from above will no longer be necessary.

The support may have pre-drilled holes in one side of the elongate channel, to allow access to the locking means.

The pre-drilled holes give guidance for the required quantity and spacing of cradles within the elongate channel, and the holes are wide enough to be able to insert the necessary tools for securing the locking means. They also reduce the installation time required for the device as a whole, as the installer does not need to dedicate time to carefully drilling well-aligned holes. It further prevents the holes being drilled incorrectly (which would negatively impact how each cradle secures to the elongate channel), and prevents the device being damaged during the course of drilling, both of which would lower its overall aesthetic value.

The elongate channel of the support may have an internal open cross-section which includes a substantially rectangular lower portion, which opens at its upper end with a concave sweep on either side. The cross-section of the elongate channel of the support may be symmetrical about a longitudinal central vertical plane.

The external cross-section of the or each cradle may include a substantially rectangular lower portion extending into a convex upper portion on either side. The concave sweeps of the upper end of the elongate channel may form an interrupted cup for receiving the convex upper portion of the or each cradle for enabling lateral rocking adjustment of the or each cradle within the elongate channel. The external width of the substantially rectangular lower portion of the cradle may be less than the internal width of the substantially rectangular lower portion of the elongate channel.

The support is designed such that the elongate channel and the cradles interlock in a jointed system, similar to a ball and socket. The interrupted cup of the elongate channel is the 'socket', into which neatly fits the 'ball' that is the convex upper portion of the cradle. The substantially rectangular lower portion of the cradle then acts as an adjustment arm, which can be used to pivot the 'ball' to tilt the or each cradle, for moving the panel into alignment with the longitudinal central vertical plane, or to align with another panel, angled out of the plane. The greater internal width of the substantially rectangular lower portion of the elongate channel compared with the external width of the substantially rectangular lower portion of the cradle provides enough freedom for this pivoting motion. The advantage of the ball and socket system is that angular adjustment of the panel can be made with a high degree of precision; a small adjustment at the level of the cradle will correlate to a much greater re-positioning of the upper edge of the panel.

The or each cradle may have a channel opening from its upper face and extending along its full length, for receiving the panel, where the width of the channel is matched or substantially matched to the external width of the panel.

The advantage of the cradle system for panel support lies in the fact that the lower edge of the panel is physically rested upon the inner face of the cradles, substantially flush with the internal surfaces of the cradles, which strengthens the hold on the panel when compared to similar supports which only clamp the faces of the panel, whilst also preventing the possibility of over-tightening the clamps and causing damage to the panel itself. In addition, the matching of the width of the channel in the cradle to the external width of the panel allows the panel to rest in place whilst it is locked into its final position, unlike in systems with clamps, in which the panel must be held in place whilst the locking means is applied. As such, this reduces the manpower and time burdens of installation.

The or each cradle may contain a first threaded aperture extending into the substantially rectangular lower portion from one side thereof. The or each cradle may also contain a second threaded aperture with a smaller diameter than the first aperture, extending from an internal end of the first aperture to the other side of the substantially rectangular lower portion. The two apertures meet at the centre of the or each cradle.

A first bolt may be inserted into the first threaded aperture, with complementary outer threading. Similarly, a second bolt may be inserted into the second threaded aperture, with complementary outer threading.

The first bolt may have an axial aperture extending through the whole length of the bolt, so as to allow access to the head of the second bolt from a single side of the or each cradle, i.e. through the aperture.

The locking means may be provided by turning the (internal hexagon) heads of the first and second bolts in the threaded apertures of the or each cradle, such that the ends of the bolts which are external to the or each cradle exert a force upon the internal surface of the substantially rectangular lower portion of the elongate channel.

There may be a concave indentation on the internal face of the substantially rectangular lower portion of the elongate channel at the end of each of the pre-drilled holes, for acceptance and alignment of the extended end of the first bolt. There may also be a concave indentation on the opposing internal face of the substantially rectangular lower portion of the elongate channel, for acceptance and alignment of the extended end of the second bolt.

The locking means of the cradles within the elongate channel is provided by the first and second bolts. Turning the heads of the bolts extends the external ends of the bolts from the faces of the cradles. When extended to a great enough degree, the ends of the bolts will apply a force to the internal faces of the substantially rectangular lower portion of the elongate channel, having aligned themselves into the indentations in the faces, such that the cradle will be immobilised and locked. Locking of each individual cradle has the advantage of stabilising the panel to a greater extent when compared with similar balustrade supports.

Angular adjustment of the panel may be provided by increasing or decreasing the force applied to the internal surface of the substantially rectangular lower portion of the elongate channel by turning the heads of one or other of the bolts.

Tightening of the first bolt, that is the bolt applying a force to the near side of the elongate channel to the installer will tilt the cradle, and therefore the upper edge of the panel, towards the installer, and tightening the second bolt will tilt the cradle away from the installer. Loosening the bolts will have the opposite effect. The advantage of the adjustment of the bolts within the cradles is twofold. The location of the bolts being internal to the cradles means that the adjustment is achieved at the base of the support, so a small adjustment in the bolt position will have a relatively large effect on the position of the upper edge of the panel. In addition, each cradle can be adjusted individually, allowing the installer to make minor vertical adjustments along the entire length of the elongate channel.

The head of the first, smaller bolt may be located on the end of the bolt facing the exterior of the or each cradle. The head of the second, larger bolt may be located on the end of the bolt facing the interior of the or each cradle.

The arrangement of the bolts within the cradles in a fashion as described allows the installer to adjust the positions of the first and second bolts from only one side. Ordinary balustrade supports require bolts or similar clamping devices to be operated from both sides of the panel. The major advantage of this invention is the single-sided operability of the locking means, and this is achieved by utilising the hollow first bolt. This provides access to the head of the first bolt for a screwdriver or similar tool, negating the need for access to the far side of the elongate channel when adjusting the angle of the panel.

One or more detachable cylindrical caps may be fitted at the external ends of the pre-drilled holes in the elongate channel, in order to cover the holes.

The cylindrical caps for the holes are mainly for decorative purposes, making the external face of the elongate channel appear as one contiguous unit, but also to offer some protection for the bolts, reducing exposure to inclement weather.

The elongate channel may have a plurality of holes in its base, to allow it to be secured to a surface, for example, with screw fixings. The holes are countersunk to receive the heads of the screw fixings.

The advantage of pre-drilled holes in the base of the elongate channel is that it will save an installer time in drilling them for himself. A balustrade will almost always be secured into place onto a surface, and the holes are a useful addition to the elongate channel.

The elongate channel may have a semi-circular groove near the lip of one side of the convex upper portion of the elongate channel into which an elongate gasket may be placed to aid with securing the panel into place and hiding the cradles from view.

A first elongate gasket may be inserted between one face of the panel and the side of the convex upper portion of the elongate channel with the semi-circular groove, the elongate gasket being shaped to slot into the semi-circular groove. A second elongate gasket may be inserted between one face of the panel and the side of the convex upper portion of the elongate channel without a semi-circular groove.

The first and second elongate gaskets may be inserted into the elongate channel, on either side of the panel, such that the upper faces of the elongate gaskets are flush with the top face of the elongate channel, and the lower faces are flush against the top face of the or each cradle. The elongate gaskets provide an added support for the panel, applying limited resistance to the panel should the cross-section of the channel of the cradle and the external cross-section of the panel be slightly mismatched. In addition, the elongate gaskets cover the cradles and internal face of the elongate channel from view, thereby providing some protection from adverse weather conditions, as well as making the support more aesthetically appealing.

In addition, all parts of the support are simple to manufacture, thus keeping the overall cost of the device to a minimum.

DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENT

Figure 1:
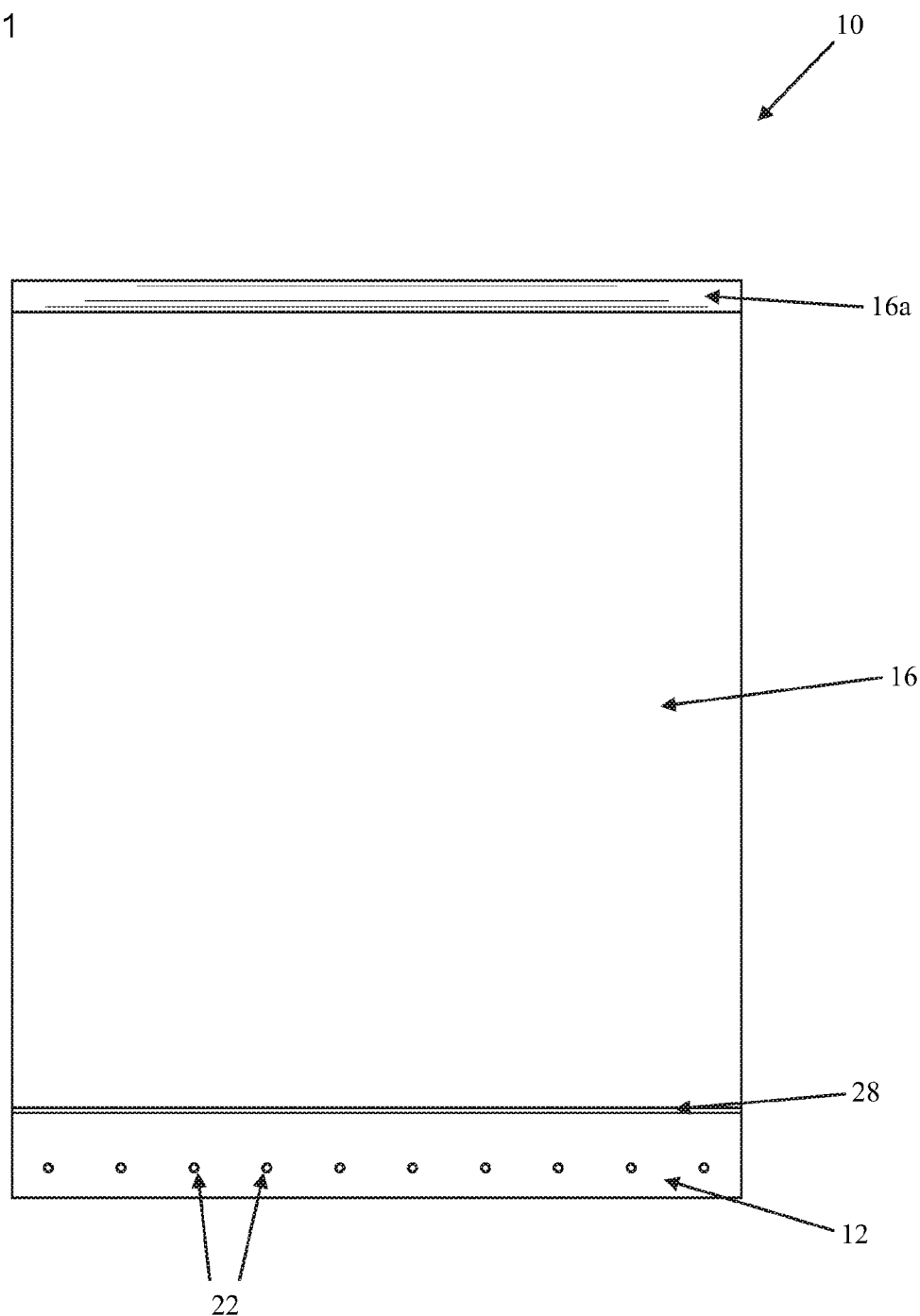
FIG. 1 is a side view of an assembly of the support and panel.
Figure 2:
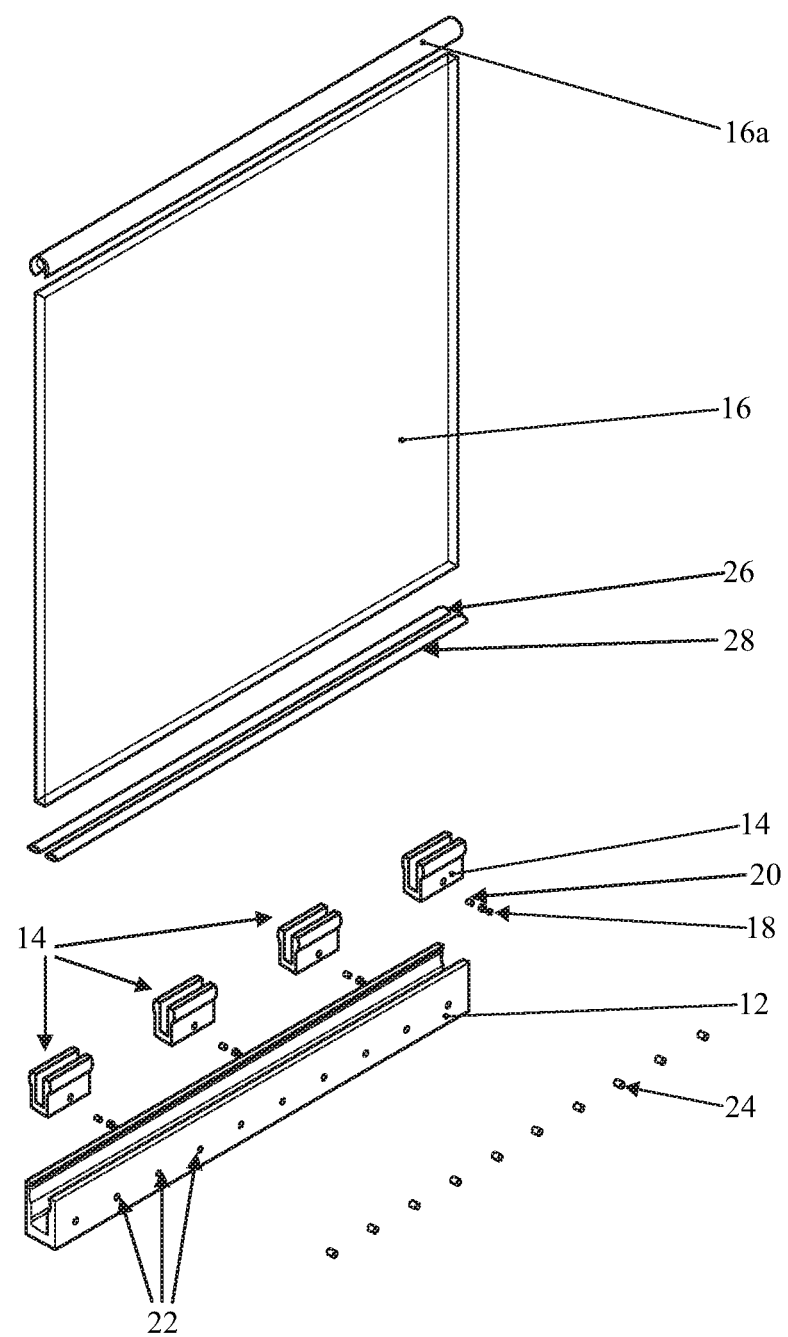
FIG. 2 is an exploded perspective view of the support and panel.

Referring firstly to FIG. 1, a support and rigid panel assembly are indicated generally at 10. Referring also to FIG. 2, the support includes an elongate channel 12, and one or more cradles 14. The cradles are designed to sit within the elongate channel 12, being inserted into the channel from above or slid into the channel from either open end, and to be angularly adjustable about a central longitudinal axis. This enables a panel 16 to be mounted within the support and adjusted so as to align with other panels within a balustrade. In other words, the cradles 14 enable each panel 16 to be adjustably tilted in and out of a central vertical plane. The panel 16 may or may not have a separate rail or capping 16a along its upper edge.

The elongate channel 12 receives one or more cradles 14. The cradles are locked into position with first 18 and second 20 bolts, which are accessible through a series of pre-drilled holes 22 in the elongate channel 12 (when the cradles 14 are correctly aligned with the holes). The pre-drilled holes 22 are covered by a plurality of cylindrical decorative caps 24. The rigid panel 16 is received by the cradles 14, and the panel is held in place with first 26 and second 28 elongate gaskets, positioned with the lower faces of the elongate gaskets flush with the upper faces of the cradles 14, and the upper faces of the elongate gaskets flush with the upper face of the elongate channel 12. The gaskets 26, 28 are somewhat flexible, so that where the cradles 14 have been angularly adjusted to tilt, each gasket 26 or 28 is still substantially flush with the upper faces of the cradles 14 and the elongate channel 12, maintaining the same aesthetic quality.

Figure 3:
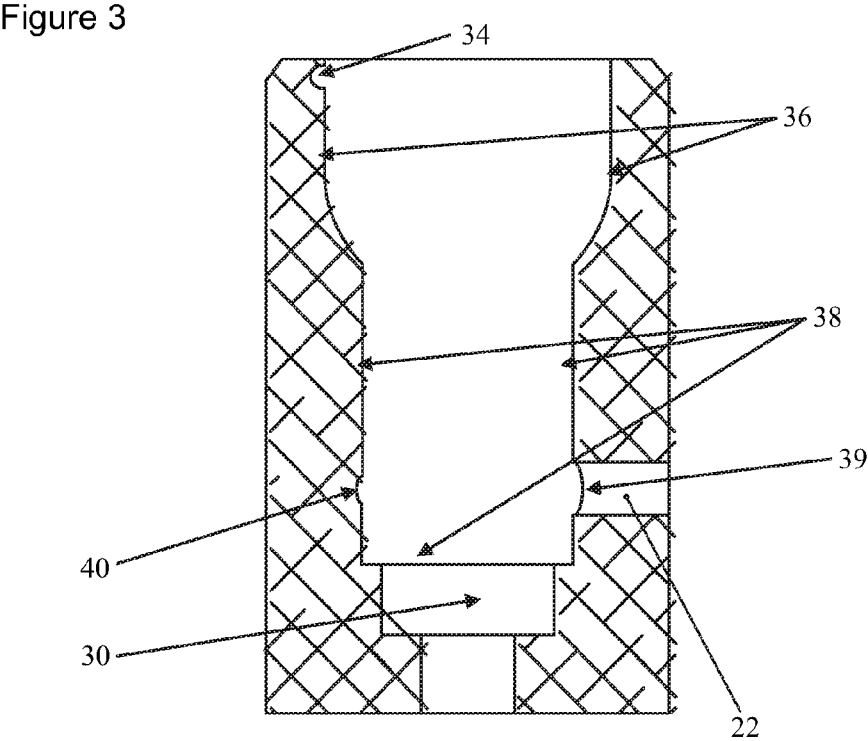
FIG. 3 is a cross-section view of the elongate channel.

Referring also to FIG. 3, the internal cross-section of the elongate channel comprises a rectangular or substantially rectangular lower portion 38 extending into a concave upper section 36 on either side. On one side, there are a plurality of pre-drilled holes 22 enabling access to the locking means of the support. On the upper edge of the opposing internal face of the elongate channel, there is a semi-circular groove 34 extending along the length of the support for accepting the first gasket 26, shown in FIG. 2. One or more holes 30 are provided through the base of the elongate channel for accepting a means.

On the internal face of the substantially rectangular lower portion 38 of the elongate channel with the pre-drilled holes 22, the internal ends of the holes have an equivalent concave indentation 39, for accepting and aligning the extruding end of the first bolt 18. On the internal face of the substantially rectangular lower portion 38 of the elongate channel opposing the pre-drilled holes 22, there is a slight concave indentation 40, for accepting and aligning the extruding end of the second bolt 20. Each indentation 39 or 40 is located to receive the extruding end of the respective bolt 18 or 20 irrespective of the tilt angle of the cradle, as angularly adjusted within the elongate channel 12 to correctly align a panel.

Figure 4:
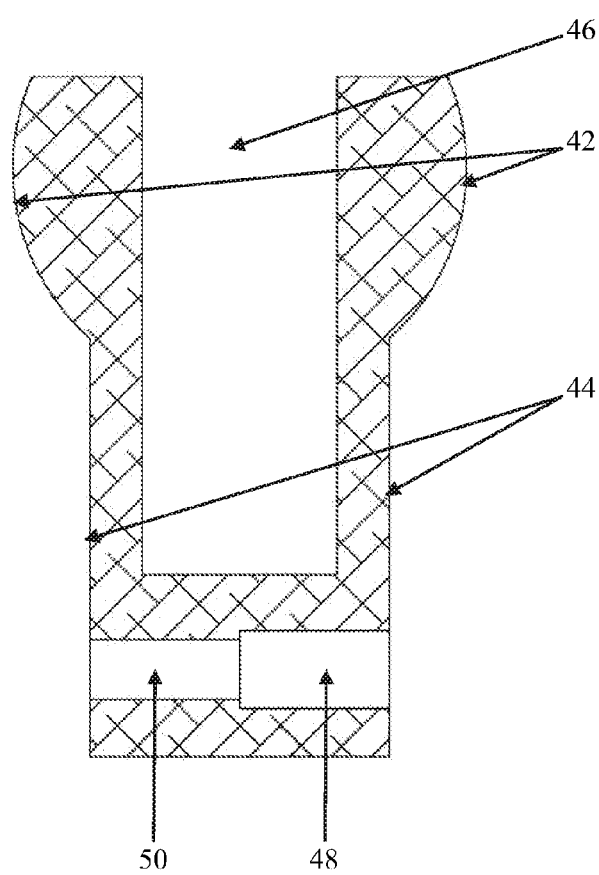
FIG. 4 is a cross-section view of a cradle (to a different scale as in FIG. 3)

In FIG. 4, a cross-section of a cradle 14 is shown. The external cross-section of the or each cradle includes a rectangular or substantially rectangular lower portion 44 extending into a convex upper portion 42 on either side. The cradle 14 contains a first threaded aperture 48 extending into the substantially rectangular lower portion 44 from one side thereof. The cradle 14 also contains a second threaded aperture 50 with a smaller diameter than the first aperture 48, extending from an internal end of the first aperture 48 to the other side of the substantially rectangular lower portion 44. The rigid panel 16 rests in the cradle 14 within channel 46 which runs through the length of each cradle. The sides of the rigid panel 16 are flush or substantially flush with the internal faces of the channel 46, so that the panel rests securely. The apertures 48, 50 meet at the centre of the or each cradle 14.

Figure 5:
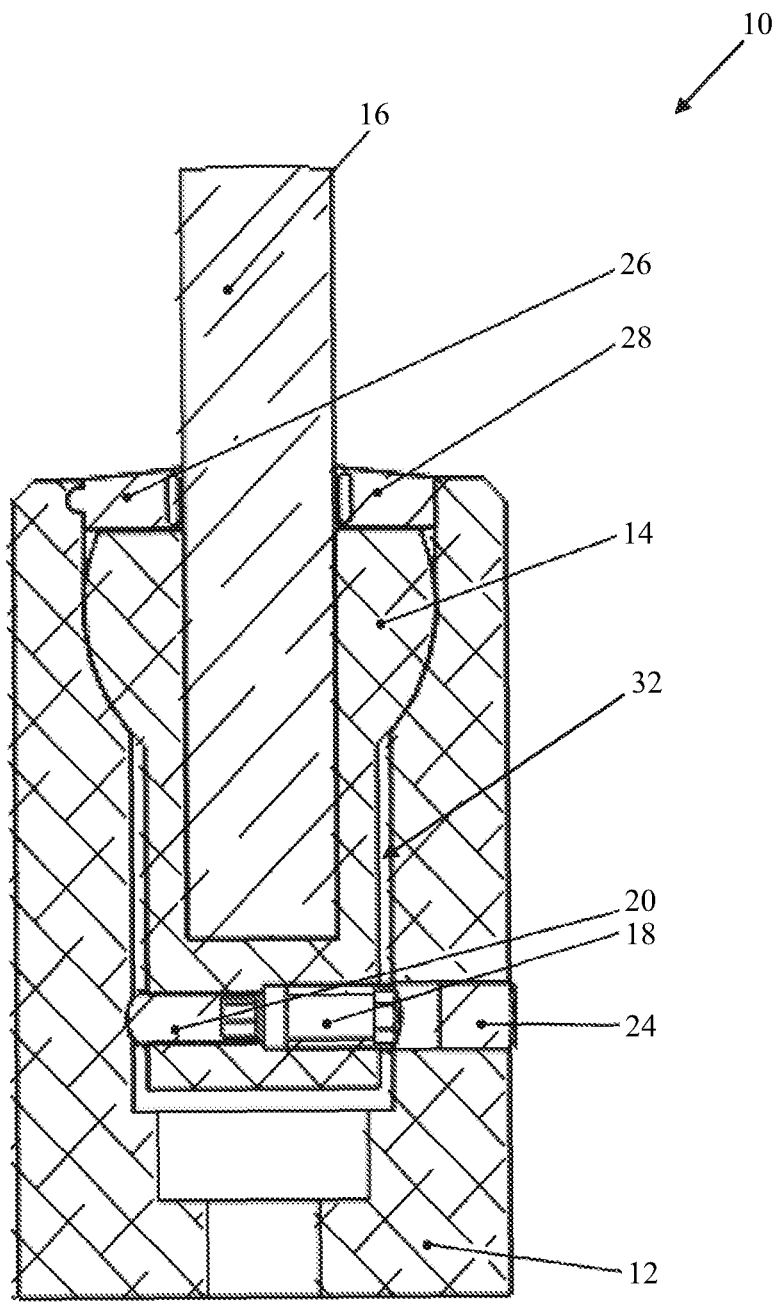
FIG. 5 is a cross-section view of the support from the end, with the panel inserted.

To assemble a balustrade, as shown in FIG. 5, the elongate channel 12 is fixed to, for example a landing or balcony, using, for example, screw fixings through the holes 30 in the base of the elongate channel. Preferably a plurality of cradles 14 are placed into the elongate channel 12 along its length, with the convex upper portions 42 of each cradle being supported by the concave upper sections 36 of the elongate channel 12. The curvature of the convex upper portions 42 is slightly greater than that of the concave upper sections 36, enabling the cradle to be adjusted in a manner similar to a ball and socket joint (where the convex upper portion 42 acts as the ball and the concave upper section 36 acts as the socket). The first and second bolts 18, 20 are pre-located in the respective threaded apertures 48, 50 prior to locating the or each cradle 14 within the elongate channel 12.

The cradles 14 are then secured in place when correctly aligned in the elongate channel 12 via tightening of the first 18 and second 20 bolts, accessible through the pre-drilled holes 22. The first bolt 18, closest to the pre-drilled holes 22 for adjustment and tightening, is hollow, thereby allowing access through its centre for actuation of the second bolt 20. In other words, the head of the second bolt 20 is accessible through the first bolt 18, enabling both bolts to be tightened from the same side of the panel 16. The first elongate gasket 26 is inserted such that its lower edge rests flush against the upper face of the cradles 14, its upper edge rests flush against the upper edge of the elongate channel 12, and its shaped side fits into the semi-circular groove 34.

The alignment of the channels 46 in the cradles 14 will now form an interrupted channel along the length of the elongate channel 12, into which the rigid panel 16 can neatly rest. The alignment of the individual cradles 14 can be altered using first 18 and second 20 bolts in order to ensure that the channel 46 of each cradle 14 is aligned with the channels 46 of other cradles 14. The rigid panel 16 can then be inserted into the cradles, from above or from either end of the channel 46. The flat side of the first elongate gasket 26 will now rest against one face of the rigid panel 16. The second elongate gasket 28 is then inserted into the gap formed between the rigid panel 16 and the upper internal face of the elongate channel 12 on the opposing face of the panel. The insertion of the two elongate gaskets 26, 28 will hold the panel in the cradles in addition to the close fit within each cradle 14.

The alignment of the rigid panel 16, either to the vertical or to another panel in a balustrade, can be adjusted by turning the heads of the first 18 and second 20 bolts on the or each cradle 14. This is facilitated by the gap 32 between the substantially rectangular lower portion 38 of the elongate channel and the substantially rectangular lower portion 44 of each cradle, which allows adjustment of each cradle within the elongate channel 12. Tightening the first bolt 18 will cause the cradle (and therefore upper edge of the panel) to tilt towards the installer, and tightening the second bolt 20 will cause the cradle (and upper edge of the panel) to tilt away from the installer. By carefully tightening the bolts on each individual cradle, the installer can make small adjustments at the level of the elongate channel 12, through the pre-drilled holes 22, to make large adjustments to the position of the upper edge of the panel, affording a relatively large degree of planar adjustment. Careful adjustment of the bolts in sequence allows the installer to align the full length of the panel 16 with a great degree of control.

Once the panel 16 is suitably aligned and locked by the bolts 18, 20, then the decorative cylindrical caps 24 may be placed into the pre-drilled holes to hide them. Where provided, the separate rail or capping 16a may then be placed atop the panel to enhance its aesthetics.

The embodiment described above is provided by way of example only, and various changes and modifications will be apparent to persons skilled in the art without departing from the scope of the present invention as defined by the appended claims.

The invention claimed is:

1. A support for a rigid panel, comprising:
   an elongate channel for attaching to a surface, the elongate channel having an upper portion including first and second concave surfaces forming an interrupted cup, and a lower portion extending from the first and second concave surfaces;
   at least one cradle for receiving an edge of the panel, the at least one cradle having an upper portion including first and second convex portions receivable in the first and second concave surfaces of the elongate channel and angularly adjustable about a longitudinal axis relative thereto, and a lower portion extending away from the upper portion of the at least one cradle and forming an adjustable arm receivable in the lower portion of the elongate channel, the lower portion of the elongate channel having an internal width greater than an external width of the adjustable arm, providing a gap between the adjustable arm of the at least one cradle and the lower portion of the elongate channel, to provide freedom for angular adjustability; and
   a locking means connected to the adjustable arm and configured for securing the at least one cradle to the elongate channel in an adjusted position, the locking means operable from only one of a pair of sides of the elongate channel.

2. The support of claim 1, wherein the locking means is disposed below a portion of the elongate channel configured to receive the edge of the panel.

3. The support of claim 2, wherein pre-drilled holes are formed in the one of the pair of sides of the elongate channel.

4. The support of claim 3, wherein an internal open cross-section of the elongate channel includes the lower portion having a substantially rectangular shape, wherein the internal open cross-section of the elongate channel is symmetrical about a longitudinal central vertical plane extending through the elongate channel.

5. The support of claim 4, wherein an external cross-section of the at least one cradle includes the lower portion having a substantially rectangular portion shape defining the adjustable arm.

6. The support of claim 5, wherein the interrupted cup enables lateral rocking adjustment of the at least one cradle within the elongate channel.

7. The support of claim 6, wherein the at least one cradle has a channel opening formed in an upper face thereof, the channel opening extending along an entirety of a length of the at least one cradle, the channel opening configured for receiving the panel, a width of the channel opening corresponding to a width of the panel.

8. The support of claim 5, wherein the at least one cradle has a first threaded aperture extending into the substantially rectangular lower portion thereof from a first side of the substantially rectangular lower portion thereof.

9. The support of claim 8, wherein the at least one cradle has a second threaded aperture extending from an internal end of the first threaded aperture to a second side of the substantially rectangular lower portion of the at least one cradle, a diameter of the second threaded aperture is less than a diameter of the first threaded aperture.

10. The support of claim 9, wherein a first bolt is inserted into the first threaded aperture and a second bolt is inserted into the second threaded aperture.

11. The support of claim 10, wherein the locking means includes the first bolt cooperating with the first threaded aperture to exert a force upon a first internal surface of the substantially rectangular lower portion of the elongate channel and the second bolt cooperating with the second threaded aperture to exert a force upon a second internal surface of the substantially rectangular lower portion of the elongate channel.

12. The support of claim 11, wherein the first internal surface of the substantially rectangular lower portion of the elongate channel includes a first concave indentation formed thereon, the first concave indentation formed at an end of one of the pre-drilled holes, the first concave indentation is configured for acceptance and alignment of an extruded end of the first bolt.

13. The support of claim 12, wherein the second internal surface of the substantially rectangular lower portion of the elongate channel includes a second concave indentation formed thereon, the second concave indentation opposing the first concave indentation and configured for acceptance and alignment of an extruded end of the second bolt.

14. The support of claim 13, wherein at least one of the first bolt and the second bolt selectively rotates to one of increase and decrease the force applied to the respective internal surface of the substantially rectangular lower portion of the elongate channel to vertically adjust the panel.

15. The support of claim 14, wherein a head of the second bolt inserted in the second threaded aperture is disposed at an end of the second bolt facing an interior of the at least one cradle.

16. The support of claim 15, wherein the first bolt inserted in the first threaded aperture is hollow to allow access to the head of the second bolt from the first side of the at least one cradle.

17. The support of claim 16, wherein a head of the first bolt inserted through the first threaded aperture is disposed at an end of the first bolt facing an exterior of the at least one cradle.

18. A support as claimed in claim 1, wherein the adjustable arm of the at least one cradle extends away from an upper face of the at least one cradle, and the at least one cradle includes a channel which extends into the adjustable arm forming the lower portion of said at least one cradle.

19. A support as claimed in claim 1, wherein a curvature of the first and second convex portions of the at least one cradle is greater than a curvature of the first and second concave surfaces of the elongate channel, for enabling movement of the adjustable arm in the gap.

20. A support for a rigid panel, comprising:
   an elongate channel for attaching to a surface, an internal open cross-section of the elongate channel includes a substantially rectangular lower portion and an upper portion having concave sweeps, wherein the internal open cross-section of the elongate channel is symmetrical about a longitudinal central vertical plane extending through the elongate channel;
   at least one cradle for receiving an edge of the panel, the at least one cradle receivable in the elongate channel and angularly adjustable about a longitudinal axis relative thereto, an external cross-section of the cradle including a convex upper portion and a substantially rectangular lower portion, the lower portion of the cradle defining an adjustable arm, a first threaded aperture extending into adjustable arm from a first side thereof, the lower portion of the elongate channel having an internal width greater than an external width of the adjustable arm to provide freedom for angular adjustability; and a locking means configured for securing the at least one cradle to the elongate channel in an adjusted position, the locking means operable from only one of a pair of sides of the elongate channel, wherein the locking means is disposed below a portion of the elongate channel configured to receive the edge of the panel and pre-drilled holes are formed in the one of the pair of sides of the elongate channel.

* * * * *